United States Patent [19]

Kaercher, Jr.

[11] 4,109,729
[45] Aug. 29, 1978

[54] DEVICE AND METHOD FOR DIVERTING ROLLS OF SOD DELIVERED FROM CONVENTIONAL SOD CUTTING APPARATUS

[76] Inventor: William C. Kaercher, Jr., 3615 Zenith Ave. N., Minneapolis, Minn. 55422

[21] Appl. No.: 665,211

[22] Filed: Mar. 9, 1976

[51] Int. Cl.² .................... A01B 45/04; A01B 49/04
[52] U.S. Cl. ......................................... 172/1; 171/19; 172/19; 172/29; 172/387; 172/395; 172/518; 172/679
[58] Field of Search ............... 172/1, 19, 20, 31, 518, 172/387, 395, 537, 389, 29, 539, 677, 679; 171/19, 63, 69; 16/19; 56/193; 214/DIG. 4

[56] References Cited

U.S. PATENT DOCUMENTS

| 66,861 | 7/1867 | Mains | 172/539 X |
|---|---|---|---|
| 297,368 | 4/1884 | Fisher | 16/19 UX |
| 554,832 | 2/1896 | Partridge | 16/19 |
| 609,334 | 8/1898 | Eisenhart | 172/389 |
| 680,267 | 8/1901 | Newton | 172/537 |
| 689,861 | 12/1901 | Dunham | 172/539 X |
| 1,216,751 | 2/1917 | Vogel | 171/63 |
| 2,617,347 | 11/1952 | Provost | 172/20 |
| 2,968,356 | 1/1961 | Mydels | 172/395 |
| 2,972,384 | 2/1961 | Thome | 171/63 |
| 3,059,706 | 10/1962 | Morkoski et al. | 172/395 UX |
| 3,117,631 | 1/1964 | Fahrenholz | 172/537 X |
| 3,485,304 | 12/1969 | Daymon | 172/19 |

FOREIGN PATENT DOCUMENTS

446,618 6/1927 Fed. Rep. of Germany ........... 172/387

Primary Examiner—Paul E. Shapiro

[57] ABSTRACT

The device is pulled behind conventional sod cutting apparatus and includes an angled roller that diverts the various sod rolls sequentially discharged from the apparatus, doing so to one side of the path traversed by the apparatus. The device also includes a frame having ground supports for supporting the roller at a slight elevation above the ground so that the roller is free to rotate in a direction determined by the still moving rolls of sod. Provision is made for optimumly adjusting the roller angle and once adjusted to maintain the same angle when changing the setting back and forth to divert rolls either to the left or right. The device also includes a hitch by which the device can be quickly unhitched at the end of each run to permit the sod cutting apparatus to be turned around more readily. Also, the roller supporting frame is adjustable to accept rollers of different lengths for accommodating sod rolls of different sizes.

15 Claims, 14 Drawing Figures

DEVICE AND METHOD FOR DIVERTING ROLLS OF SOD DELIVERED FROM CONVENTIONAL SOD CUTTING APPARATUS

BACKGROUND OF THE INVENTION

1. Field of the Invention

This invention relates generally to apparatus for cutting sod into strips of predetermined length and then forming the severed strips into individual rolls, and the invention pertains more particularly to a device and method for diverting the sod rolls to either the left or right so that the rolls are not in the way of the apparatus during the next run across the field of turf.

2. Description of the Prior Art

Where sod cutting apparatus moves back and forth across the field of turf, which is the customary and efficient way of cutting sod, the sod is automatically cut into strips of predetermined width and length, and then formed into individual rolls which remain behind the apparatus as it continues across the field. There is, quite obviously, no interference on that particular run, but on the next run in the reverse direction, the apparatus, being somewhat wider than the sod strips it cuts and hence somewhat wider than the length of the resulting rolls of sod, repeatedly hits one end of each of the previously deposited sod rolls. It is, of course, a costly nuisance to pick up the rolled sod prior to the next run. A bulldozer-like blade has been mounted on the front of the apparatus and simply bumps against each sod roll as it is encountered on the return trip. This bumping action results in an appreciable amount of jarring which can be annoying to the operator. Also, the weight of the bulldozer blade is a decided disadvantage inasmuch as it is concentrated at the front of the sod cutting apparatus where it adversely affects the operation of the equipment, particularly where soft soil conditions are encountered, for it causes the apparatus to sink into the ground, aggravated by the bumping and at times miring the apparatus to the extent that the sod cutting operation cannot be continued. Also, the bumping of the stationary sod rolls knocks loose some of the soil that should remain in order to maintain the sod in a fresh and usable condition for relatively long periods since it is never known just when the sod will be laid. Still further, the bumping of the rolled sod causes it to partially unroll, making the picking up operation more difficult.

SUMMARY OF THE INVENTION

Accordingly, one object of the invention is to divert the rolls of sod to one side as they are discharged from conventional sod cutting apparatus. More specifically, an aim of the invention is to divert the rolls of sod to either the left or right, the operator selecting the appropriate side for the direction in which the apparatus will be moving.

Another object of the invention is to provide a device for diverting rolls of sod utilizing a roller that can be adjusted into various angles so as to achieve the best diversion possible for the particular soil conditions with which the operator is then being confronted. Also, it is within the contemplation of the invention to maintain the same optimum roller angle that has been determined when changing the diverting direction from one side to the other side.

Still further, an object is to provide for the diverting of rolls of sod formed from different widths of strips. In this regard, it is within the purview of the invention to make a simple roller substitution which will permit the diverting of rolls having different lengths, the width of a roll being determined by the width of the severed strip. More specifically, when 18 inch wide strips are being cut and rolled, one roller will be employed; when, say, 24 inch widths are being cut, the roller can readily be replaced with a longer one.

Another object is to provide a device which will effectively divert rolls of sod formed from different length strips.

Yet another object of the invention is to provide a sod roll diverting device that can be quickly unhitched and rehitched at the end of each run across the field of turf, thereby enabling the sod cutting apparatus to be turned around more readily.

Still further an object is to enable my device to remain horizontal, even though the sulky to which it is coupled tilts or cants due to one sulky wheel being higher than the other.

Also, an object of the invention is to divert each sod roll so that it will not partially unwind by the time it comes to its rest position, whereby the subsequent picking up of the various diverted sod rolls is facilitated.

A further object is to preserve the condition of each roll of sod, the diverting action taking place before the sod roll discharged from the sod cutting apparatus has had an opportunity to stop moving. In this regard, the diverting action is of a continuous character so that there is no adverse bumping or jarring of the sod roll with a concomitant loosening of earth which should continue to cling to the tendrils or roots in order to maintain the sod in good condition.

Also, another object is to provide a device for diverting rolls of sod that can be manufactured inexpensively, thereby encouraging its widespread use by those engaged in sod cutting operations.

Briefly, my invention contemplates the use of conventional sod cutting apparatus in which the turf is cut into strips having a predetermined length and then automatically formed into individual sod rolls that have heretofore been left in the path behind the sod cutting apparatus during a run across a field of turf in one direction. To prevent interference when the next run is undertaken across the field, the device constructed in accordance with my invention makes use of a relatively lightweight frame that is attached to the drawbar of the sulky on which the operator rides, the point of attachment permitting the device to accommodate rolls of sod formed from different lengths of severed strips. Provision is made for permitting the device to remain horizontal, even though the sulky tilts or cants from side to side due to one wheel being on the uncut turf and the other wheel on the ground from whence the turf has been removed. Also, provision is made for quickly unhitching the device so that the sod cutting apparatus to which it is attached can be turned around more readily.

At the rear of my device is a roller that is held in a slightly elevated relation with respect to the ground so that it is free to rotate in the direction the sod roll is still rotating. The roller can be adjusted into various angles so that the diversion of the various rolls of sod can be realized in a highly effective fashion, the angle of the roller influencing the final position in which the rolled sod comes to rest. A proper adjustment of the angle causes each roll of sod to stop rolling when the free end or flap is hanging over the top of the roll so that the roll will not partially unwind, thereby making the subsequent picking up of the diverted rolls much easier. Once an appropriate roller angle has been found, the angle can readily be maintained through the agency of a clamping mechanism which assures that the roller will continue to rotate about the same axis. Provision is made for changing the direction of diversion from the left to the right, this being done without changing the roller angle itself once the proper angle has been determined.

DESCRIPTION OF THE PREFERRED EMBODIMENT

Inasmuch, as my invention is intended to function with conventional sod cutting apparatus, it will be well to describe such apparatus generally so that the advantages of my invention will be better appreciated. With this in mind, attention is directed to FIG. 1 where typical sod cutting apparatus has been denoted in its entirety by the reference numeral 10 and my device for diverting sod rolls by the reference numeral 12. At the outset it should be understood that the apparatus 10 severs strips of sod from the field of turf being traversed, cuts the severed strips to predetermined lengths, rolls the strips into individual sod rolls and then leaves them in the path or swath from which the rolls have been obtained.

Figure 1:
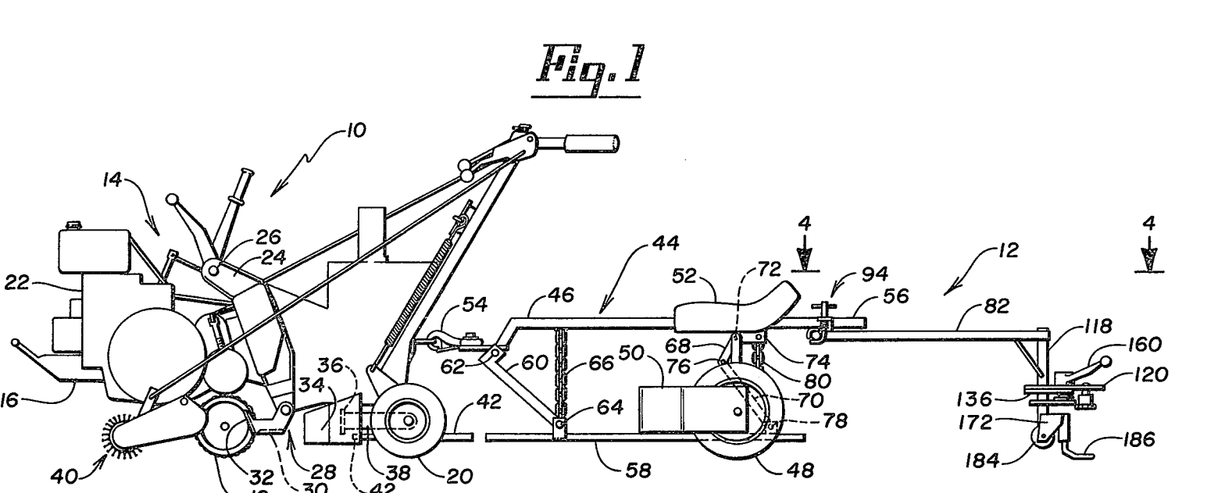
FIG. 1 is a side elevational view of conventional sod cutting apparatus having a device exemplifying my invention attached to the rear thereof, the device being shown before the diverting roller is angularly adjusted.

Accordingly, the apparatus 10 comprises a sod cutting machine 14 which is generally similar to that described in U.S. Pat. No. 2,905,253, granted to Frances J. Ditter on Sept. 22, 1959 and titled "SOD CUTTING MACHINE". Therefore, it includes a frame or chassis 16 having a pair of side by side traction drive rollers 18 and a pair of rear wheels 20. An engine 22 not only drives the rollers 18 but also oscillates a pair of arms 24 about a horizontal axis 26.

At the lower ends of the arms 24 is a U-shaped blade unit 28 having a horizontal bottom knife edge 30 and vertical side knife edges 32. Deflecting guards 34 for the rear wheels 20 conceal from view the usual cut-off knife 36 mounted on the forward end of a pair of generally horizontal arms 38. A measuring mechanism 40, corresponding to the arrangement described in U.S. Pat. No. 3,913,682, granted to William C. Kaercher, Jr. et al. on Oct. 21, 1975 and titled "CONTROLS FOR A SOD CUTTER BLADE", determines when the knife 36 is to be urged downwardly. Thus, the blade unit 28 severs a strip of sod and the knife 36 cuts the strips into predetermined lengths. Most commonly, the blade unit 28 produces 18 inch width sod strips and the knife 36 cuts the strips into six foot lengths; however, it should be noted that the width of sod strips sometimes is 24 inches and the strips can be as long as nine feet in length, my invention permitting any conventional width and length, when formed into a roll, to be effectively diverted.

Once each sod strip has been severed and cut to the desired length, they are formed into individual rolls. A strip kicker or roll starter 42 simply assumes a tilted angle so that the forward edge thereof strikes the rear end of the sod strip to kick up that end of the strip, as its name implies, and thus initiate the rolling action.

A so-called sulky 44 includes a frame 46 and a pair of wheels 48 with wheel guards 50. Above the wheels 48 is an operator's seat 52. The forward end of the frame 46 is equipped with a suitable hitch 54 so that the sulky can be coupled to the rear of the sod cutting machine 14. The sulky 44 has a rearwardly projecting drawbar 56 which will be referred to more specifically hereinafter.

The sulky 44 further includes a guide rack 58 that continues the development of each sod roll after it has been started by the kicker 42. In order to permit the rack 58 to ride over the roll as it is being formed, it is suspended by a pair of forwardly disposed pivot arms 60 having an upper pivot 62 and a lower pivot 64. The rack 58 is limited in its downward movement by a chain 66. The rear of the rack 58 is suspended by an upper rear arm 68 and a lower rear arm 70. the upper arm has an upper pivot 72 carried in a mount 74 that is integral with the frame 46, being located beneath the seat 52. There is also an intermediate pivot 76 that connects the lower end of the arm 68 to the upper end of the arm 70 plus a lower pivot at 78. Here again, a limit chain 80 is utilized which functionally corresponds to the chain 66 so that both ends of the rack 58 are properly suspended.

The description of the apparatus 10 which has continued up to this stage is conventional and does not constitute part of my invention other than that my invention begins where the prior art apparatus 10 has heretofore left off. Referring now in detail to my device 12 for diverting sod rolls, it will be perceived from FIG. 3 that it includes an A-frame 82. The forward or wider end of the frame 82 has a swivel-type attaching mechanism 84 which includes a bracket 85 having an inverted U-shaped configuration, the lower edges of the bracket 85 being welded to a second bracket 86 also having an inverted U-shaped configuration. Still a third U-shaped bracket 87, which is upright, has a cross rod or bar 88 fixedly welded therebeneath. The two brackets 86 and 87 are pivotally connected together by means of a pin 89; in this way the cross bar 88 is free of swivel in a vertical plane (but not in a horizontal one) so that the frame 82 will remain horizontal even when the sulky 44 tilts, which it does in actual operation because one wheel 48 is higher than the other by reason of being on uncut turf. The bracket 85 has a pair of nuts 90 secured thereto which are over a pair of holes. In this way, clamping bolts 91, one for each nut 90, can be tightened and locked by use of jam nuts 92, so as to clamp the bracket 85 on the drawbar 56 at the proper position for maintaining my device 12 in the best trailing relationship as will hereinafter be made manifest.

At this time, attention is directed to a pair of release mechanisms 94, each including a mounting plate 96 which is welded to the two corners at the forward or wider end of the A-frame 82. The mounting plate 96, in each instance, has a downturned retention flange 98 at its forward edge. At the outer side of each plate 96 is a triangular keeper 100 (FIG. 6) which is in obstructive relation with the ends of the cross rod or bar 88 so that the frame 82 is prevented from shifting laterally at its forward end. Also from FIG. 6 it can be discerned that there is an L-shaped guide strip 102 having a vertical leg 103 extending upwardly from the plate 96 and a horizontal leg 104, the vertical leg 103 maintaining a parallel, spaced relation of the horizontal leg 104 above the plate 96.

Figures 6, 7, 8, 9, 10:
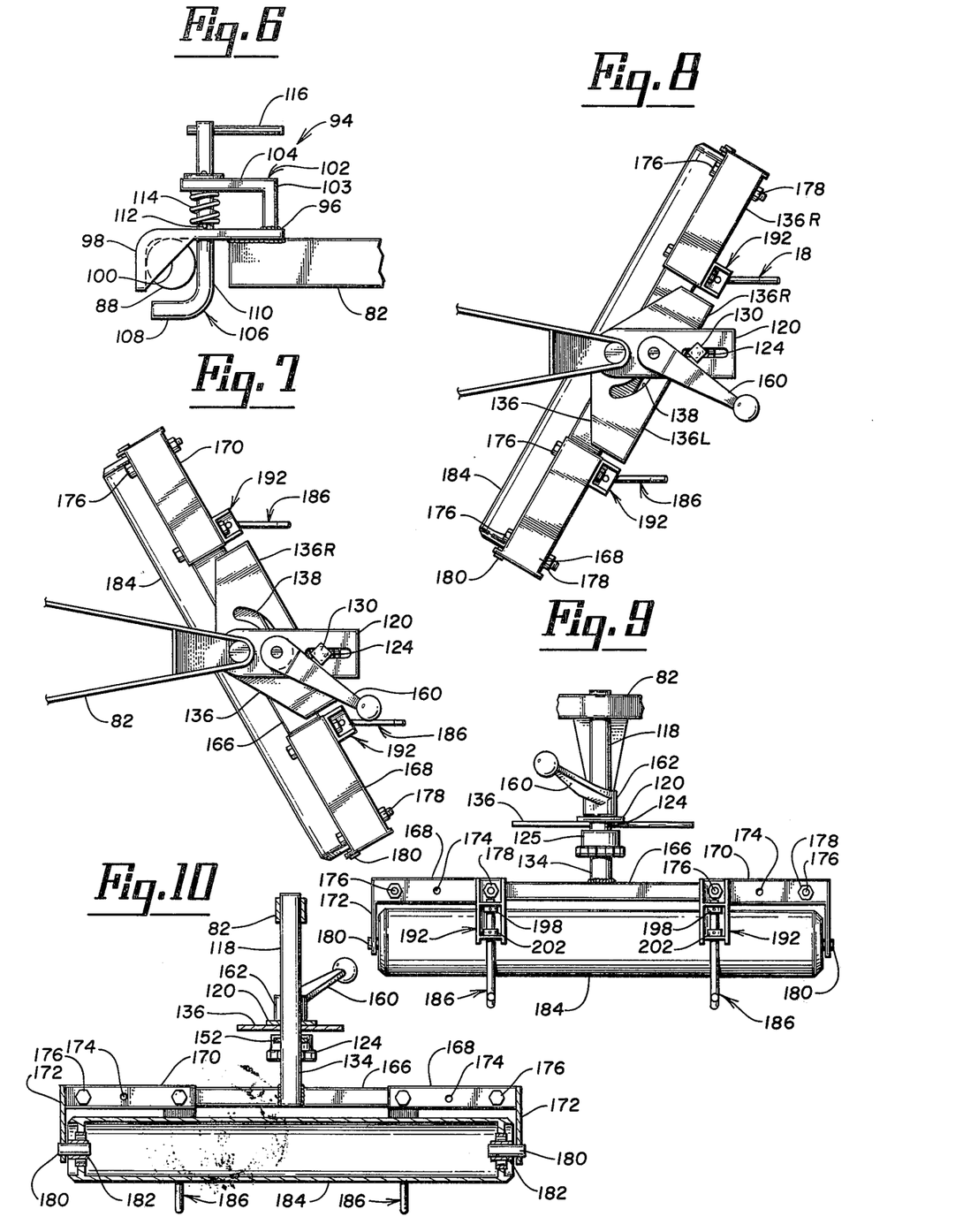
FIG. 6 is an elevational detail view taken in the direction of line 6—6 of FIG. 4 for the purpose of additionally clarifying the hitching and unhitching procedure.
FIG. 7 is a fragmentary top plan view of the rear portion of my device, the view being taken in the direction of line 7—7 of FIG. 3.
FIG. 8 is a fragmentary top plan view corresponding to FIG. 7 but with my device adjusted for diverting sod rolls to the right.
FIG. 9 is a rear elevational view of my device, the view looking forwardly in the direction of line 9—9 of FIG. 4 for the purpose of showing the manner in which one roller can be substituted for another when different size sod rolls are to be diverted.
FIG. 10 is a sectional view taken in the direction of line 10—10 of FIG. 4 for the purpose of illustrating the bearing structure for the roller and the manner in which one roller can be substituted for another.

Each mechanism 94 further includes an L-shaped latch rod 106, the rod 106 having a horizontal leg portion 108 and a vertical leg portion 110. The vertical leg portion 110 has a transverse pin 112 extending diametrically therethrough so as to underlie a coil spring 114. Whereas the pin 112 bears against the bottom of the coil spring 114, the upper or top of each coil spring 114 bears against the overlying leg 104 of the guide strip 102. Adjacent the upper end of the vertical leg 110 is a handle 116 by which the L-shaped latch rod 106 can be pulled upwardly to compress the coil spring 114 and also permit rotation of the horizontal leg portion 108 thereof from its obstructive relation beneath the cross rod or bar 88.

Figures 12, 13, 14:
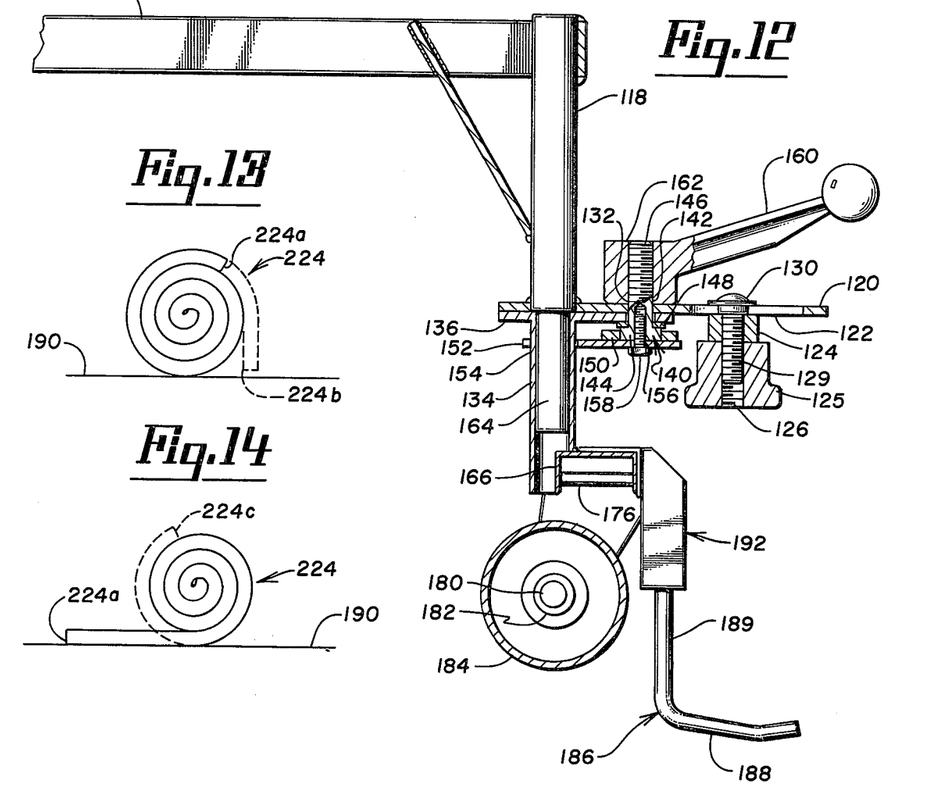
FIG. 12 is a sectional view taken in the direction of line 12—12 of FIG. 4 for the purpose of showing to better advantage how the roller is adjusted into various angles and also how it can be changed so as to divert sod rolls to either the left or right without loss of angularity, the view being on a somewhat larger scale than that of FIG. 4 and on a somewhat smaller scale than that of FIG. 10.
FIG. 13 is an enlarged end view of a properly diverted sod roll, the view being in the direction of line 13—13 of FIG. 2.
FIG 14 is a view corresponding to FIG. 13 but depicting the sod roll when improperly diverted.

As can best be seen in FIG. 12, the rear end of the frame 82 has welded thereto a downwardly depending vertical tube 118. At the lower end of the tube 118 is welded a horizontal plate 120 having a longitudinally directed slot 122 formed therein. An adjustable stop, the purpose of which will presently be explained, includes a bushing 124 and a nut in the form of a knob having a tapped hole 126 extending therethrough, the knob 125 threadedly receiving therein a bolt 129 provided with a square head 130 at its upper end, the square head 130 being sufficiently large so as to overlie the marginal portions of the slot 122. In addition to the slot 122, the plate 120 is also provided with a hole 132 disposed forwardly of the slot 122.

There is also a lower tube 134 directly beneath the upper tube 118. Welded to the upper end of the lower tube 134 is a plate 136 having a straight rear edge, one half of which edge has been labeled 136L and the other half 136R to facilitate a subsequent explanation. The plate 136 contains an arcuate slot 138 in registry with the hole 132, a clamping member 140 extending upwardly through the slot 138 and the hole 132. The clamping member has a threaded shank 142 and a square head 144 at its lower end. Extending upwardly from the lower end of the member 140, that is through its square head 144, is a tapped hole 146. Between the square head 144 and the lower surface of the plate 136 is a washer 148.

The square head 144 is received within a member 150 having a square hole therein, the member 150 being welded to the upper side of a strip 152 that underlies the plate 136. The underlying strip 152 has a relatively large circular hole at one end thereof so that this end can loosely encircle the tube 134 so as to permit the strip 152 to move upwardly with respect to the tube 134 and also to be swung about the vertical axis of the tube 134. The strip 152 also has a smaller hole 156 through which a bolt 158 extends, the threaded end of the bolt 158 being received in the tapped hole 146 of the member 140. A handle 160 having a nut or threaded portion 162 integral therewith is threaded onto the shank 142. To assure alignment of the tubes 118, 134, a shaft 164 is employed.

Hence, it follows that prior to threading the bolt 158 upwardly into the tapped hole 146 of the member 140, the shank 142 can be advanced upwardly into the threaded end 162 of the handle 160, this being with the strip 152 slid downwardly along the tube 134 so as not to offer any interference. After a snug fit has been achieved, the threaded shank 142 is backed off or downwardly so as not to effect any clamping action. It is then that the strip 152 is moved upwardly and the square head 144 fitted into the member 150 having the square hole therein that is of a size to receive the square head 144. After this has been done, the handle 160 can be rotated through whatever angle less than 360° that will provide the requisite clamping action, all for a purpose subsequently to be dealt with.

Figure 11:
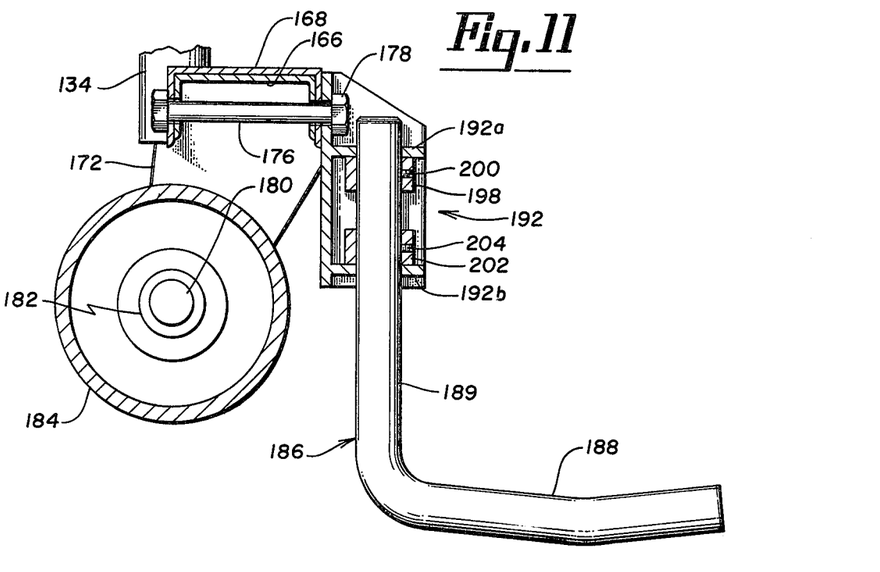
FIG. 11 is an enlarged sectional view taken in the direction of line 11—11 of FIG. 4 for the purpose of showing how the roller is held slightly above the ground in order to permit it to rotate freely.

Secured to the bottom of the tube 134 is a channel member 166, the channel member being welded intermediate its ends to the tube 134. It will be appreciated that the channel member 166 can assume any number of angular positions depending upon the angular position into which the tube 134 is rotated and clamped by means of the handle 160. Whereas the channel member 166 is attached to the tube 134 at its center, there are two additional end channel members 168, 170 that overlie the free end portions of the channel member 166. FIG. 11 shows the interfitting or telescoping relationship between the end channel member 168 and one end portion of the base channel member 166. Each end channel member 168, 170 is provided with a downwardly extending arm 172. Also, it will be perceived that the members 166, 168 and 170 are formed with registrable holes 174 which can accommodate therein bolts 176 having nuts 178.

At the lower ends of the arms 172 are inwardly projecting pins 180 which are secured to the arms 172. The pins 180 extend inwardly into bearings 182 contained within a cylindrical roller 184. By removing the bolts 176, and spacing the end channel members 168, 170 outwardly with respect to each other, a longer roller 184 can be utilized. In this regard, it can be stated that the roller 184 that has been pictured can be used for sod strips having an 18 inch width which would produce 18 inch wide sod rolls, and the longer roller would accommodate sod rolls having, say, a two foot or 24 inch width.

The roller 184 performs an important function when practicing my invention. In this regard, the roller 184 is free to rotate about the axis provided by the inwardly directed pins 180. To achieve this goal, a pair of L-shaped skids 186 are employed, each having a horizontal foot portion 188 and a vertical leg portion 189. The horizontal foot portions 188 are dragged across the ground 190 and maintain the roller 184 in an elevated relationship above the ground, as will now be explained.

Accordingly, a pair of swivel mounts 192 are secured to the rear faces of the end channel members 168, 170, as can best be discerned from FIG. 11. Each swivel mount 192 has apertured upper and lower webs or platforms 192a and 192b, respectively, integral therewith. An upper ring 198 encircles the vertical leg portion 189 of each L-shaped skid 186, there being a set screw 200 that retains this particular ring 198 at the desired location on the vertical leg portion 189. A similar ring member 202 having a set screw 204 is fixedly spaced beneath the upper ring member 198. Not only do the rings 198, 202 permit the skids 186 to swivel, functioning as bearings for this purpose, but they play a very important additional role in keeping the roller 184 in an elevated or raised condition above the ground 190 during the diverting of the sod rolls. Consequently, as my device 12 is dragged along by the apparatus 10, the horizontal foot portions 188 ride over the ground 190 and can swing angularly to whatever degree is needed. In this way, they act as stabilizers in concert with the attaching mechanism 84 at the front to prevent rear end sway of the frame 82. Stated somewhat differently, they function as effective ground guides for the rear end of my entire device 12 and at the same time hold the roller 184 sufficiently above the ground 190 so that it is free to rotate during the sod roll diverting procedure.

Figure 2:
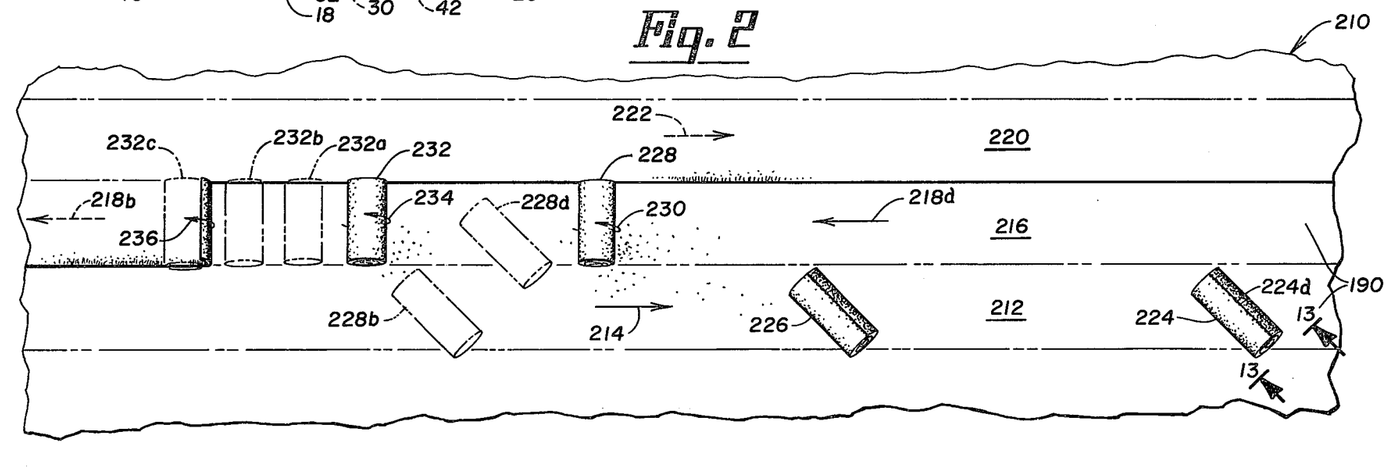
FIG. 2 is a diagrammatic plan view of a portion of a field in which a sod cutting operation is in progress, the view showing a number of sod rolls in various stages of completion including two that have been diverted.

FIG. 2 has been prepared with the thought in mind that it will not only help in appreciating the benefits to be derived from a practicing of my invention, but at the same time facilitate an understanding of what transpires. Therefore, in FIG. 2 a field of turf has been denoted generally by the reference numeral 210. It will be assumed that several complete runs across the field 210 have already been completed and that one resulting path has been labeled 212; the solid arrow 214 represents the direction taken by the sod cutting apparatus 10 when cutting and rolling sod on that particular run. Since it is customary to have the sod cutting apparatus 10 move back and forth across the field 210, the run currently in progress, although the apparatus 10 and my device 12 are not shown, is indicated by the reference numeral 216. The solid line arrow 218a signifies the portion of the path from which the sod has already been stripped to expose the ground 190, whereas the dotted arrow 218b represents the turf yet to be stripped. The succeeding or next run, this to be in the same direction as the run 212, has been given the reference numeral 220 and the prospective direction of the apparatus 10 by the dotted arrow 222.

It should be apparent that the apparatus 10, of necessity, has to be somewhat wider than the strip of sod being cut. In other words, the blade unit 28, more specifically its horizontal knife edge 30 and its laterally spaced vertical knife edges 32, determine the width of the strip that is cut. Because portions of the machine 14 overhang or extend laterally beyond the blade unit 28, these overhanging portions have previously struck one end of the previously discharged sod rolls. Two already diverted rolls of sod, resulting from the use of my invention, have been given the reference numerals 224 and 226. It should be recognized that these diverted rolls 224 and 226, now stationary, have been diverted from the path or run 216, more specifically, the portion thereof identified by the solid arrow 218a. Another sod roll 228, still rolling as evidenced by the arrow 230, has been shown which has not yet been contacted by the angled roller 184 (not shown in FIG. 2). Because of the lateral overhang, as mentioned above, of the machine 14, if the roll 228 is not diverted by the time the succeeding run identified by the reference numeral 220 is undertaken, this being in the direction of the dotted arrow 222, one end of the roll 228 would be hit.

Figures 3, 5:
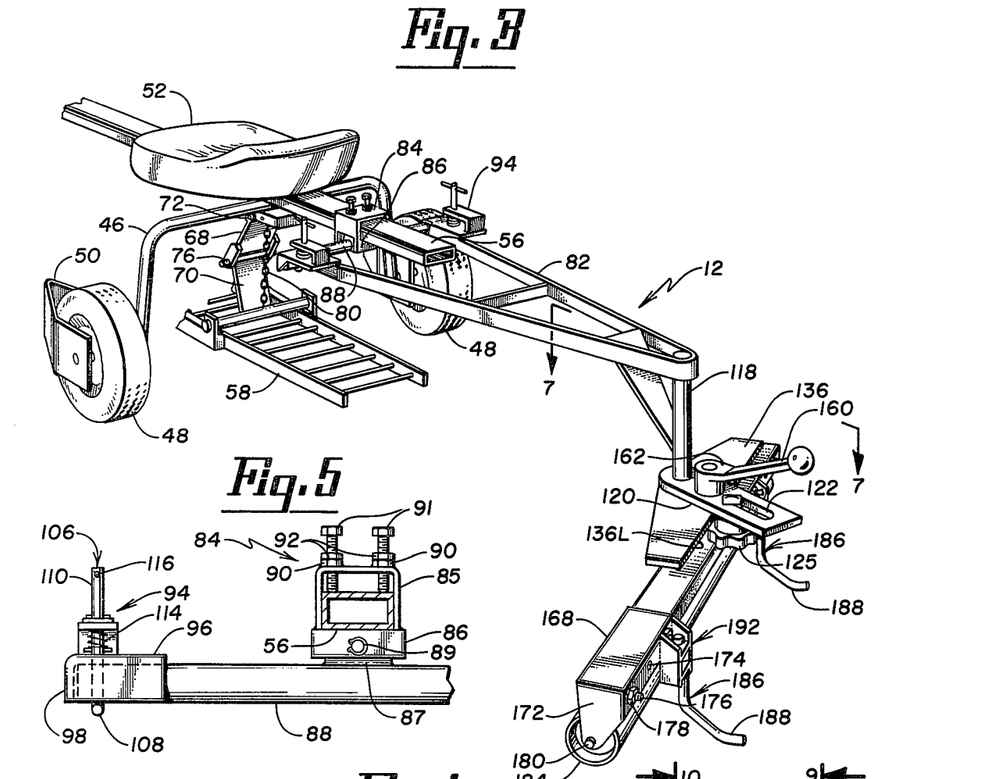
FIG. 3 is a perspective view of the rear end of the sod cutting apparatus pictured in FIG. 1, the view showing my device after the roller has been adjusted for diverting sod rolls to the left.
FIG. 5 is a sectional view taken in the direction of line 5—5 of FIG. 4 for the purpose of illustrating how my device can be quickly hitched and unhitched.

However, assuming that the roll 228 has been just discharged from the apparatus 10 and is rolling in the direction of the arrow 230, more specifically leaving the sulky 44 and even more precisely moving from beneath the rack 58 thereof, when the roller 184, the roller 184 being angled as shown in FIGS. 3 and 7, engages one end of the sod roll 228, it gently nudges this end of the roll 228 so that the roll soon assumes the same angle as the roller 184. The roller 184, being above the ground 190, is free to rotate and does so during the entire diverting procedure. The angular shifting of the sod roll 228, as the apparatus 10 is further advanced, has been indicated by the reference numeral 228a. Continued progression or advancement of the apparatus 10 will cause the roll 228 to reach the position labeled 228b. It is when the roll 228 reaches the position 228b that this particular roll is fully diverted and is clear of the roller 184 on the reverse trip or run 220. The roller 184 then moves against the next roll 234 which, as was the roll 228, is just being discharged from the rear end of the apparatus 10, more specifically from the sulky 44. It, too, is rolling, as indicated by the arrow 234, and the same roll progression, as with the roll 228, takes place, positions corresponding to those labeled 228a and 228b occurring but at a later time.

The development of the roll 232 is indicated by the dotted outlines of rolls labeled 232a, 232b and 232c, the roll at 232a being less complete than the roll 232 but more complete than at 232b. The roll at 232c represents the beginning of the roll which results in the fully formed roll 232. In other words, the kicker 42 has just impinged on the rear end of a severed strip, kicking it over in the direction of the arrow 236.

It is of importance to understand that the swivel mechanism 84 can be adjustably clamped to the drawbar 56 of the sulky 44, the bracket 85 simply being shifted longitudinally along the drawbar 56 and the bolts 91 tightened so as to bear against the drawbar to maintain the correct adjustment. When properly adjusted for a given length of sod strip, the roller 184 engages a sod roll, such as that labeled 228, before it has stopped rolling, as denoted by the arrow 234, this being after leaving the apparatus 10, more specifically after being discharged from beneath the suspended rack 58 of the sulky 44 that is keeping the roll moving. This is a decided advantage because the roller 184 never strikes a stationary sod roll, thereby obviating the bumping and jarring that has heretofore resulted from attempts to bulldoze stationary rolls, which are quite heavy.

The roller 184, owing to its slight elevation above the ground 190, is always free to rotate in a direction that does not interfere with the direction in which the roll 228 (and others) is rolling and it simply assures that the roll 228 continues to roll in the direction of the arrow 230 until completely diverted. It is important to recognize that with my device 12, the roll 228 (and all others) does not stop rolling as long as it is being pushed by the roller 184. Thus, the roll 228 is advanced through the position 228a into its completely diverted position 228b at which time it ceases rolling, just as the previously diverted rollers 224 and 226 have done.

One nicety of the invention is that the rolling distance, such as that for the rolls 224, 226 and 228b, is determined by the angle of the roller 184. By simply adjusting the angle of the roller 184, the flap or loose end of the various rolls 224, 226, 228 can be made to hang over the top of the roll at the time the roll stops rolling. Actually, a very precise stopping of the rolling action can take place so that the loose end or flap curves upwardly and over the top of the roll and remains in this relation. Any indiscriminant stopping of the sod roll would result in the flap or loose end frequently unwinding so that it lays on the ground 190, thereby rendering the subsequent picking up of such partially unrolled sod rolls more difficult, as is believed evident.

The two possible happenings, one being desirable and the other undesirable, referred to in the preceding paragraph have been portrayed, respectively, in FIGS. 13 and 14. From FIG. 13, it will be noted that the free end denoted by the reference numeral 224a is past the top or 12:00 o'clock position of the roll 224, being pretty much at the 1:00 o'clock position, which keeps this end 224a, and of course the loose flap adjacent same, from unwinding or unrolling. This is the desirable relationship. It should be apparent that if the loose flap extended farther around to, say, the 5:00 o'clock position (or any position therebetween), which has been indicated in phantom outline by the reference numeral 224b, there would be no problem as far as any unrolling is concerned. On the other hand, from FIG. 15, it should be obvious that if the roll 224 stopped with the dotted free end at 224c, approximately the 11:00 o'clock position, the loose flap would unwind and lay flat as indicated in solid outline in this figure. It should be apparent that any final position from the 11:00 o'clock position around to about the 7:00 o'clock position would also result in the roll unwrapping, although to a lesser degree. Consequently, it should be recognized that the operator has considerable leeway in angularly adjusting the roller 184; all he needs to do is to make an adjustment that results in the sod roll 224 stopped with the free end 224a somewhere between the solid line or 1:00 o'clock position and the dotted line or 5:00 o'clock position, the latter having been given the reference numeral 224b. This can readily be achieved by merely noting the position of a roll or two, making an adjustment, and then noting where another roll or two stops.

When the apparatus 10 and my device 12 reach the end of a run, such as the run 216, the apparatus 10 must be turned around so as to start the succeeding run 220. It is at this time that the ability to unhitch the device 12 becomes quite important. All that need be done is to lift the two L-shaped latch rods 106, rotating them about vertical axes provided by their vertical legs 110 so that the horizontal legs 108 are moved from beneath the cross rod or bar 88. Then, the forward end of the frame 82 can be lifted slightly; the device 12 is then completely unhitched from the sulky 44, the apparatus then being capable of being turned around more readily. Once the apparatus 10 has been turned around so that it faces in the direction of the dotted arrow 222, which is the direction to be taken when traversing the field 210 in making the next run 220, the latch rod 106 can be relatched as is believed to be understandable from FIG. 6.

Figure 4:
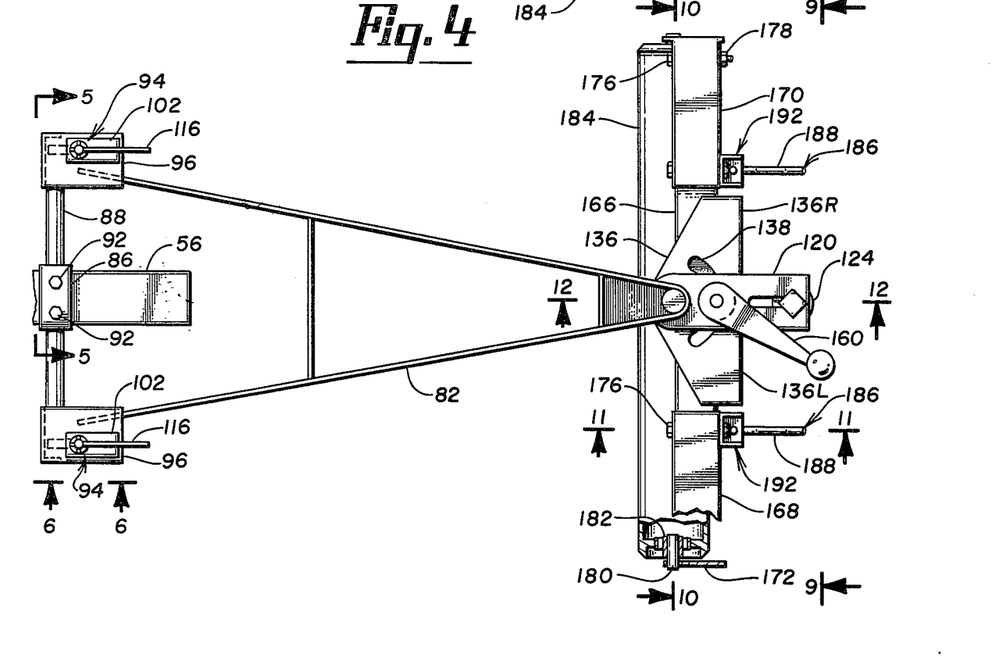
FIG. 4 is a top plan view of my device, the view being taken in the direction of line 4—4 of FIG. 1.

When making the return trip across the field 210 in the direction of the arrow 222, it follows that the sod rolls produced during the run 220 should be diverted to the right in contradistinction to the left when making the run 216. Provision is made for doing this. All that the operator need do is to loosen the handle 160 so that the roller 184 can be swung into an opposite angle, the opposite angle being equal to the angle at which the run 216 has been made. Loosening the handle 160 permits the plate 136 containing the arcuate slot 138 therein to be shifted from the position shown in FIG. 7, in which its rear edge portion 136L is engaged with the stop 124, to that shown in FIG. 8, in which the rear edge portion 136R engages the stop 124, the plate 136 moving through the central position appearing in FIG. 4 during the changing operation. Of course, it is presumed that the stop 124 has been properly positioned to provide the optimum angle which results in the various sod rolls, such as those labeled 224 and 226, coming to rest with the free end thereof curving over the top, as illustrated in FIG. 13. This is determined by simply watching several sod rolls, as previously explained, and making an appropriate adjustment to effect the proper orientation of each roll when it stops rolling. The thickness of the sod strip and the length thereof will influence the final position of each roll, but once the stop 124 has been properly located, then unless the conditions change, no further adjustment thereof is needed.

Should a wider strip be cut, resulting in wider sod rolls 224, 226, 228 and 230, then a longer roller 184 should be used. All that is required is that the downwardly extending arms 172 be moved outwardly with respect to each other. To accomplish this, the bolts 176 are taken out by first removing the nuts 178. Then, the end channel members 168, 170, the downwardly extending arms 172 being integral with these channels, are repositioned and the appropriately aligned holes 174 made use of by inserting the bolts 176 in the now differently aligned holes and reapplying the nuts 178.

As already indicated, the swivel-type attaching mechanism 84 can be positioned at different locations on the drawbar 56 so as to assure that the roller 184 always engages each roll of sod while it is still moving, the arrows 230 and 234 signifying the rolling that is taken advantage of, thereby avoiding the jarring that would result from engaging a stationary roll of sod which, as can be appreciated, is quite heavy. If the strips are to be nine feet long, in contradistinction to six feet, then the U-shaped bracket 85 is moved farther toward the rear on the drawbar 56 and the bolts 91 tightened to maintain the proper spacing of the roller 184 rearwardly from the sulky 44, hence delaying the moment the roller 184 contacts each sod roll after its discharge from beneath the rack 58.

Inasmuch as the sulky 44 is canted or leaning toward one side or the other, depending upon which of its wheels 48 is riding on the unsevered turf 210, the swivel action made possible by the pin 89 permits the A-frame 82 to adjust itself for this happening. Stated somewhat differently, the attitude of the A-frame 82 is determined by the roller 184, being horizontal if the field of turf 210 is horizontal and sloping somewhat if the terrain is sloping. Yet the device 12 is always constrained to follow directly behind the sulky 44, for the pin 89 compels the cross bar 88 to rock only vertically about a horizontal axis and never horizontally about a vertical axis, so that the device 12 traverses a straight course without sway, assisted, of course, by the skids 186.

I claim:

1. In combination, a sod cutting apparatus for successively discharging sod rolls rearwardly therefrom when transversing a field of turf, and a device for diverting said successively discharged sod rolls, said device comprising a roller, and means mounting said roller at an acute angle with respect to the direction of travel across the field, whereby the more forwardly disposed end of said roller successively engages one end of each sod roll, causing each of said rolls to be shifted into an angle corresponding to that of said roller and move relatively along said roller to a location beyond its other more rearwardly disposed end.

2. A device for diverting sod rolls successively discharged from sod cutting apparatus when transversing a field of turf comprising a roller, means mounting said roller at an acute angle with respect to the direction of travel across the field, ground engaging means attached to said mounting means for elevating said roller above the ground, said mounting means being adjustable through an angular range sufficient to change the more forwardly disposed end of the roller to a more rearwardly disposed position and the more rearwardly disposed end of the roller to a more forwardly disposed position so that various roller angles can be achieved in order to divert sod rolls either to the left or to the right, and stop means for determining the more forwardly and rearwardly disposed end positions of the roller, said angle maintaining means including upper and lower tubular members, a horizontal plate element affixed to the lower end of said upper tube, a horizontal plate element affixed to the upper end of said lower tube, and means for clamping said plate elements in various angular relationships to maintain said roller in any of a number of selected angles, whereby the more forwardly disposed end of said roller successively engages one end of each sod roll, causing each of said rolls to be shifted into an angle corresponding to that of said roller and move relatively along said roller to a location beyond its other or more rearwardly disposed end.

3. A device in accordance with claim 2 in which one of said plate elements has an arcuate slot therein and the other of said plate elements a hole in registry with said slot, said clamping means including a threaded stud extending through said hole and slot and a threaded handle on said stud for urging said plate elements together to clamp said plate elements in various angles.

4. A device in accordance with claim 3 in which said plate element having said hole therein also contains a longitudinal slot, said stop means including a member positionable at various locations along said longitudinal slot, said plate element containing said arcuate slot having edge portions engageable with the member of said stop means to determine said more forwardly and more rearwardly end positions of said roller.

5. A device for diverting sod rolls successively discharged from sod cutting apparatus when traversing a field of turf comprising a generally horizontal frame, hitch means at one end of said frame, a roller for engaging the sod rolls successively discharged from the sod cutting apparatus, means mounting said roller beneath the other end of said frame at an acute angle with respect to the direction of travel across the field, ground engaging means attached to said mounting means for elevating said roller above the ground, said mounting means and ground engaging means also being at said other end of the frame, said hitch means including a member attachable to the drawbar of a sod cutting apparatus at various locations therealong, said hitch means further including a crossbar suspended from said member for swivel movement in a vertical plane about a generally horizontal axis, and a pair of laterally spaced release mechanisms carried on said frame for connection and disconnection with end portions of said crossbar for hitching and unhitching said frame to and from the sod cutting apparatus.

6. A device in accordance with claim 5 in which each release mechanism includes an L-shaped latch member having a vertical leg and a horizontal leg, said horizontal leg in each instance underlying said cross bar when said frame is hitched and shiftable from under said cross bar when said frame is to be unhitched.

7. A device in accordance with claim 6 in which said vertical legs of said L-shaped latch members are to the rear of said cross bar, said mechanisms also including means to the front of said cross bar and means at the ends thereof, said frame being lifted upwardly to effect said unhitching when said horizontal legs of said L-shaped latch members are shifted from beneath said cross bar.

8. A device for diverting sod rolls successively discharged from sod cutting apparatus when traversing a field of turf comprising a frame having a forward end and a rear end, means at the forward end of said frame for connecting said frame to said sod cutting apparatus, a roller for engaging the sod rolls successively discharged from the sod cutting apparatus, means mounting said roller to the rear end of said frame for free rotation at an acute angle with respect to said frame and to the direction of travel of said frame across the field, said mounting means including a horizontal central channel member and a pair of end channel members, said end channel members having a downwardly extending arm, and an inwardly extending pin on each arm for journaling the ends of said roller, and ground engaging means attached to said mounting means for maintaining said roller above the ground so that during operation said roller is free to rotate in a direction determined by successively discharged sod rolls as they are engaged by said roller.

9. A device in accordance with claim 8 including means for attaching said end channel members to said central channel members at different locations so as to accommodate different length rollers.

10. A device for diverting sod rolls successively discharged from sod cutting apparatus when traversing a field of turf comprising a roller for engaging sod rolls successively discharged from the sod cutting apparatus, means mounting said roller at an acute angle with respect to the direction of travel across the field, ground engaging means attached to said mounting means for elevating said roller above the ground, said ground engaging means including a pair of laterally spaced L-shaped skids, respective means attaching said skids to said mounting means for swivel movement with respect to said mounting means, each of said attaching means including upper and lower apertured horizontal platforms extending from said mounting means, each L-shaped skid including a vertical leg portion, the vertical leg portions being received in the upper and lower apertured horizontal platforms of said attaching means, and a horizontal foot portion, and a pair of vertically spaced rings encircling each vertical portion and each ring being anchored to its particular vertical leg portion with the upper ring in each instance bearing against the underside of the upper platform with which it is associated and the lower ring in each instance bearing against the upper side of the lower platform with which it is associated.

11. A device in accordance with claim 10 including a set screw for anchoring each ring at a preferred location on the particular vertical leg portion with which each ring is associated to determine the location of said horizontal foot portions with respect to said mounting means and hence the elevation of said roller above the ground against which said foot portions bear.

12. A method of diverting sod rolls successively discharged from sod cutting apparatus when traversing a field of turf comprising the steps of engaging each roll of sod as it is discharged from the sod cutting apparatus, shifting each roll from its discharged position in which it resides transversely with respect to the direction of travel across the field into an angular position and causing each roll to roll while in its angular position to one side of the path traversed by the sod cutting apparatus.

13. A method in accordance with claim 12 in which said engaging step is performed while each sod roll is still rolling after being discharged from said sod cutting apparatus.

14. A method in accordance with claim 13 in which each roll is rolled at an angle such as to cause it to stop rolling with its loose end extending over the top of the roll when stopped.

15. A method in accordance with claim 12 in which each roll of sod is shifted into one angular position on one run of said apparatus across the field and into an opposite angular position on the succeeding run across the field in a reverse direction.

* * * * *